(12) United States Patent
Kazimirsky et al.

(10) Patent No.: US 12,366,909 B2
(45) Date of Patent: Jul. 22, 2025

(54) POWER CONSUMPTION CONTROL BY TOGGLING BANDWIDTH SHAPERS

(71) Applicant: Mellanox Technologies, Ltd., Yokneam (IL)

(72) Inventors: Amit Kazimirsky, Givat Shmuel (IL); Eyal Srebro, Kfar Yehoshua (IL); Niv Aibester, Herzliya (IL); George Elias, Tel Aviv (IL)

(73) Assignee: Mellanox Technologies, Ltd, Yokneam (IL)

( * ) Notice: Subject to any disclaimer, the term of this patent is extended or adjusted under 35 U.S.C. 154(b) by 212 days.

(21) Appl. No.: 18/309,842

(22) Filed: May 1, 2023

(65) Prior Publication Data

US 2024/0370074 A1    Nov. 7, 2024

(51) Int. Cl.
| | | |
|---|---|---|
| *G06F 1/3206* | (2019.01) | |
| *H04L 47/10* | (2022.01) | |
| *H04L 47/22* | (2022.01) | |

(52) U.S. Cl.
CPC ............ *G06F 1/3206* (2013.01); *H04L 47/10* (2013.01); *H04L 47/22* (2013.01)

(58) Field of Classification Search
CPC ........ G06F 1/3206; H04L 47/10; H04L 47/22
See application file for complete search history.

(56) References Cited

U.S. PATENT DOCUMENTS

| | | |
|---|---|---|
| 7,839,878 B2 | 11/2010 | Hino et al. |
| 8,205,102 B2 | 6/2012 | Kabbara et al. |
| 8,897,314 B1 | 11/2014 | Krivitski et al. |
| 9,118,489 B2 | 8/2015 | Hayashi et al. |
| 9,288,151 B2 | 3/2016 | Chapman et al. |
| 10,205,683 B2 | 2/2019 | Elias et al. |
| 10,462,632 B2 | 10/2019 | Artstain et al. |
| 10,511,989 B2 | 12/2019 | Hsu et al. |
| 11,159,455 B1* | 10/2021 | Matthews ............... H04L 47/22 |
| 2012/0120958 A1 | 5/2012 | Mahadevan et al. |
| 2012/0218896 A1* | 8/2012 | Ygberg ............... H04L 41/0816 370/235 |
| 2012/0289224 A1* | 11/2012 | Hallberg ........... H04W 52/0206 455/424 |
| 2015/0185797 A1 | 7/2015 | Cooper et al. |
| 2017/0230269 A1* | 8/2017 | Kamath ............... H04L 41/0823 |
| 2023/0057068 A1 | 2/2023 | Bhandarkar et al. |
| 2024/0085971 A1 | 3/2024 | Cao |

OTHER PUBLICATIONS

U.S. Appl. No. 18/503,219 Office Action dated Sep. 29, 2024.

* cited by examiner

*Primary Examiner* — Brian T Misiura
(74) *Attorney, Agent, or Firm* — Meitar Patents Ltd.; Daniel Kligler (57) ABSTRACT

A device includes one or more ports, one or more bandwidth shapers, and processing logic. The one or more ports are to connect to a communication network. A given bandwidth shaper is to: (i) when disabled, output traffic at an available full data rate, and (ii) when enabled, output the traffic at a specified shaper data rate lower than the available full data rate. The processing logic is to receive or generate notifications, which are indicative of average power that is consumed by the network device while outputting traffic through the one or more bandwidth shapers via the one or more ports, and based on at least some of the notifications, toggle at least one of the one or more bandwidth shapers between being enabled and disabled, to retain the average power consumed below a specified power budget.

22 Claims, 4 Drawing Sheets

POWER CONSUMPTION CONTROL BY TOGGLING BANDWIDTH SHAPERS

TECHNICAL FIELD

Embodiments described herein relate generally to data communication, and particularly to methods and systems for controlling power consumption by toggling bandwidth shapers.

BACKGROUND

Various types of electronic devices and circuits may consume amounts of electrical power that may vary in time. It is sometimes required to control the power consumption of a device, for various purposes.

Methods for controlling power consumption in electronic devices are known in the art. For example, U.S. Pat. No. 9,118,489 describes a communication system that has: a monitoring unit monitoring power consumption in a switching unit forwarding a communication message; a power consumption data transmission unit transmitting data indicating the power consumption monitored by the monitoring unit; a control signal receiving unit receiving a control signal; a control unit controlling a data transfer rate on the basis of content of control included in the control signal received by the control signal receiving unit; a power consumption data receiving unit receiving the data indicating the power consumption transmitted by the power consumption data transmission unit; a control determination unit determining, on the basis of the data received by the power consumption data receiving unit, target of control and the content of control regarding power consumption; and a control signal transmission unit transmitting the control signal including the target of control and the content of control determined by the control determination unit.

As another example, U.S. Pat. No. 10,462,632 describes techniques to effect scenario analysis. Included is determining of a power-affecting operational setting based on at least one operating condition of a device, the at least one operating condition of the device to be an operating condition of the device while the device is communicatively coupled to another device; and a setting of a first operational setting of the device based on the determined power-affecting operational setting.

SUMMARY

An embodiment that is described herein provides a device that includes one or more ports, one or more bandwidth shapers, and processing logic. The one or more ports are to connect to a communication network. A given bandwidth shaper is to: (i) when disabled, output traffic at an available full data rate, and (ii) when enabled, output the traffic at a specified shaper data rate lower than the available full data rate. The processing logic is to receive or generate notifications, which are indicative of average power that is consumed by the device while outputting traffic through the one or more bandwidth shapers via the one or more ports, and based on at least some of the notifications, toggle at least one of the one or more bandwidth shapers between being enabled and disabled, to retain the average power consumed below a specified power budget.

In some embodiments, the processing logic is to toggle the one or more bandwidth shapers at different first and second duty cycles in response to different first and second values of the average power consumed. In other embodiments, the processing logic is to toggle the one or more bandwidth shapers to improve an overall data rate flowing through the network device while retaining the average power consumed below the specified power budget. In yet other embodiments, the notifications are indicative of crossing one or more defined power thresholds.

In an embodiment, the processing logic is to toggle the one or more bandwidth shapers by (i) enabling the one or more bandwidth shapers in response to detecting that the average power consumed is above a specified high power limit lower than the power budget, and (ii) disabling the one or more bandwidth shapers in response to detecting that the average power consumed is below a specified low power limit lower than the power budget. In another embodiment, the processing logic is to configure the shaper data rate so that for a defined worst-case traffic pattern flowing through the network device, constantly enabling the one or more bandwidth shapers guarantees that the average power consumed does not exceed the power budget. In yet another embodiment, the one or more ports are coupled to links having a specified line rate, and the worst-case traffic pattern corresponds to (i) transmitting packets via the one or more ports at a data rate that equals the line rate, and (ii) the packets having a minimal packet size that allows achieving the line rate.

In some embodiments, the one or more ports include a plurality of ports, and the processing logic is to configure the shaper data rate depending on an overall number of active ports among the plurality of ports. In other embodiments, the processing logic is to configure the shaper data rate based on modeling dynamic power consumption that varies over time depending on traffic attributes selected from a list including a data rate and a packet size. In yet other embodiments, the processing logic is to configure the shaper data rate based on a shaper factor specifying a ratio between the shaper data rate and the available full data rate.

In an embodiment, the processing logic is to configure the shaper data rate based on a traffic pattern caused by a virus attack. In another embodiment, the processing logic is to configure the shaper data rate adaptively by applying a control loop that adapts the shaper data rate based on actual power level consumed by the device.

There is additionally provided, in accordance with an embodiment that is described herein, a method for communication, including, in a device that includes one or more ports for connecting to a communication network, and one or more bandwidth shapers, with a given bandwidth shaper (i) when disabled, outputs traffic at an available full data rate, and (ii) when enabled, outputs the traffic at a specified shaper data rate lower than the available full data rate, receiving or generating notifications, which are indicative of average power that is consumed by the device while outputting traffic through the one or more bandwidth shapers via the one or more ports. Based on at least some of the notifications, at least one of the one or more bandwidth shapers is toggled between being enabled and disabled, to retain the average power consumed below a specified power budget.

These and other embodiments will be more fully understood from the following detailed description of the embodiments thereof, taken together with the drawings in which:

DETAILED DESCRIPTION OF EMBODIMENTS

Overview

Embodiments that are described herein provide methods and systems for controlling power consumption of a network device by toggling bandwidth shapers in the network device. Moreover, the time duration in each of the toggling states is adjusted dynamically to meet a power consumption budget while increasing the overall data rate flowing through (or output by) the network device.

A network device such as a network switch or router is typically powered by an external power source, e.g., a Voltage Regulator (VR). The power source may provide power to the network device alone, or a common power supply may be shared by the network device and one or more other electronic devices or processors such as Graphics Processing Units (GPUs), for example. Power sharing and management is applicable, for example, when the network device resides within a larger system such as a System on a Chip (SoC).

The power consumed by the network device (and possibly other devices) may vary in time, e.g., due to varying traffic patterns, the number of ports in the network device being active, varying computational resources required, and the like. In a power-managed system, the power supplied may be steered among different devices based on varying conditions and demands.

The power supply typically supports providing electrical power to the network device up to a specified power budget. Exceeding this power budget may result in overheating and damage to the network device, power supply or both. In principle, to protect against excessive power or electrical current drawn, the power supply could monitor the overall average power consumed, and upon exceeding the power budget, shut the power supply down. Such an aggressive approach may however render the system nonfunctional for long periods of time.

A network device may consume excessive power for various reasons such as, for example, due to extreme real-life usage, or due to demanding traffic patterns caused, e.g., by a virus attack. One way to limit the power consumed by the network device could be to limit the overall data rate flowing through the network device to a safe level. With this approach, however, the overall data rate is often lowered more than necessary for meeting the power budget, which may degrade network performance attributes such as throughput and latency.

In the disclosed embodiments, the average power consumed by a network device is controlled by toggling the egress data rate between full and reduced data rates, to retain the power consumption below the power budget while improving the overall egress data rate.

Consider a network device, comprising one or more ports, one or more bandwidth shapers, and processing logic. The one or more ports are to connect to a communication network. A given bandwidth shaper is to (i) when disabled, output traffic at an available full data rate, and (ii) when enabled, output the traffic at a specified shaper data rate lower than the available full data rate. The processing logic is to receive or generate notifications indicative of extreme average power consumed by the network device while outputting traffic through the one or more bandwidth shapers via the one or more ports, and based on the notifications, toggle the one or more bandwidth shapers between being enabled and disabled, to retain the average power consumed below a specified power budget.

In some embodiments, the toggling pattern depends on the average power consumed, e.g., the processing logic is to toggle the one or more bandwidth shapers at different first and second duty cycles in response to different first and second values of the average power consumed.

In some embodiments, the processing logic is to toggle the one or more bandwidth shapers to improve an overall data rate flowing through the network device while retaining the average power consumed below the specified power budget.

The network device may receive the notifications from the power supply, or generate the notifications based on power measurements provided by the power supply, wherein the notifications are indicative of crossing one or more defined power thresholds.

In some embodiments, the processing logic is to toggle the one or more bandwidth shapers by (i) enabling the one or more bandwidth shapers in response to detecting that the average power consumed is above a specified high power limit that id lower than the power budget, and (ii) disabling the one or more bandwidth shapers in response to detecting that the average power consumed is below a specified low power limit that is lower than the power budget.

In determining the shaper data rate, various factors may be taken into considerations. For example, the shaper data rate may be determined based on worst-case traffic conditions. In such embodiments, the processing logic is to configure the shaper data rate so that for a defined worst-case traffic pattern flowing through the network device, constantly enabling the one or more bandwidth shapers guarantees that the average power consumed does not exceed the power budget. In an embodiment, given that the one or more ports are coupled to links having a specified line rate, the worst-case traffic pattern may correspond to (i) transmitting packets via the one or more ports at a data rate that equals the line rate, and (ii) the packets having a minimal packet size that allows achieving the line rate.

In some embodiments, the network device comprises a plurality of ports, each of which may be activated or deactivated at any given time. In these embodiments, the processing logic is to configure the shaper data rate depending on an overall number of active ports among the plurality of ports.

In an embodiment, determining the shaper data rate is based on modeling dynamic power consumption that varies over time depending on traffic attributes selected from a list comprising a data rate and a packet size. In another embodiment, the processing logic is to configure the shaper data rate based on a shaper factor specifying a ratio between the shaper data rate and the available full data rate.

In some embodiments the network device may be subjected to a traffic pattern created by a virus attack. In such embodiments, the processing logic is to configure the shaper data rate based on the traffic pattern caused by the virus attack.

In some embodiments, in addition to controlling the toggling of the bandwidth shapers for some shaper data rate, the value of the shaper data rate (or shaper factor) may also be adapted. In such embodiments, the processing logic is to configure the shaper data rate adaptively by applying a control loop that adapts the shaper data rate based on usage of the power shapers.

In the disclosed techniques, a network device comprises bandwidth shapers that support disabled and enabled operational modes. When disabled, the shapers output traffic at the full available data rate, and when enabled, the shapers output traffic at a data rate lower than the full available data rate, e.g., reduce the full available data rate by a shaper factor tuned to worst-case traffic conditions. By toggling the shapers between being enabled and disabled, at a suitable duty cycle, the network device improves the overall egress data rate while meeting a power budget assigned to the network device.

System Description

Figure 1:
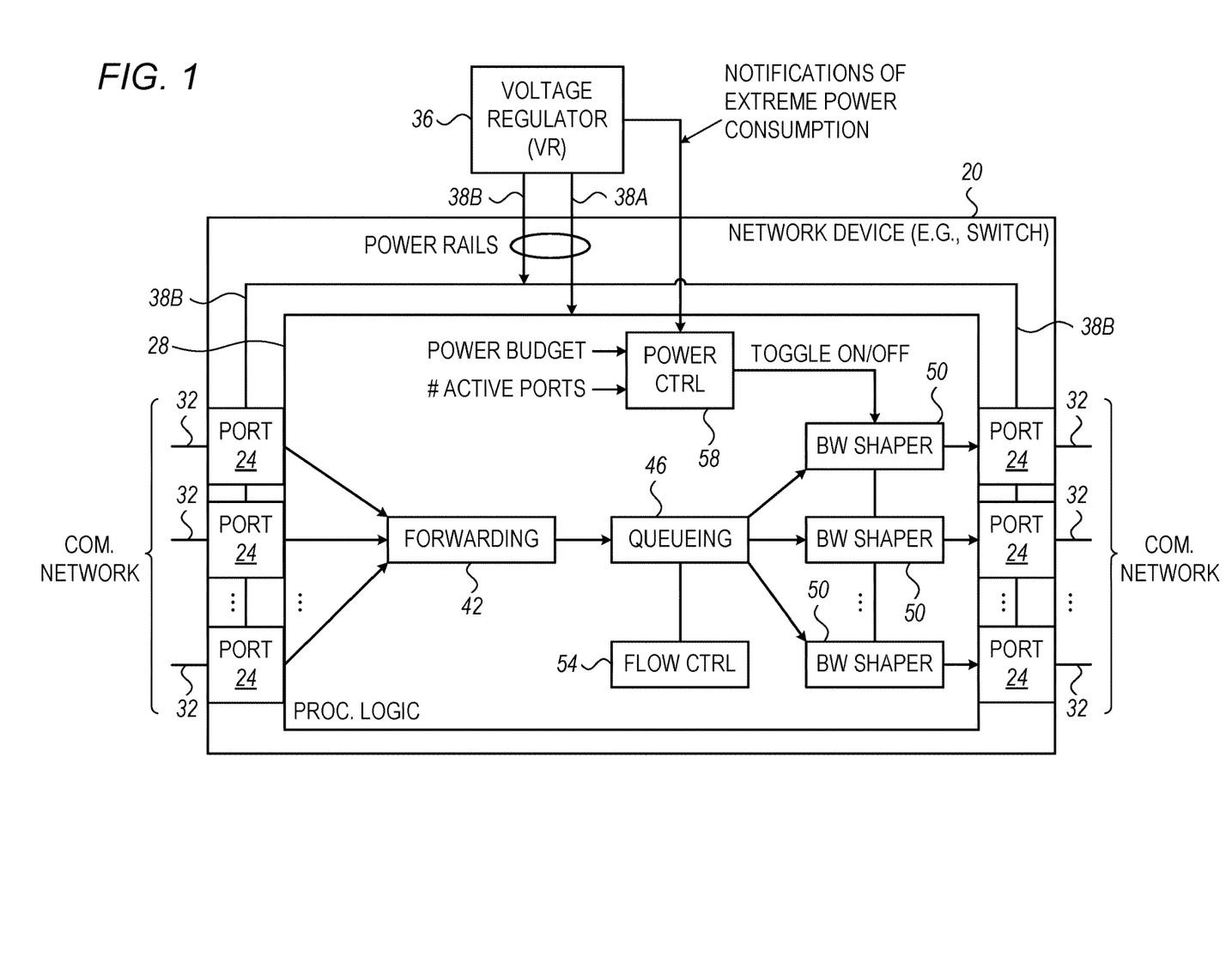
FIG. 1 is a block diagram that schematically illustrates a network device controlling power consumption by toggling bandwidth shapers, in accordance with an embodiment that is described herein.

FIG. 1 is a block diagram that schematically illustrates a network device 20 controlling power consumption by toggling bandwidth shapers, in accordance with an embodiment that is described herein.

Network device 20 comprises multiple ports 24, and processing logic 28. The ports are coupled to a communication network (not shown) using links 32. The communication network may comprise any suitable packet network operating using any suitable communication protocols, such as, for example, an Ethernet network or an InfiniBand network. Links 32 may comprise any suitable types of links such as twisted-pair or coaxial cables, for example.

Network device 20 may comprise a network switch or router. Alternatively, the network device may comprise any other suitable device that sends packets to and receives packets from the communication network, such as a network adapter, e.g., a Network Interface Controller (NIC), or a Host Channel Adapter (HCA) in case of an InfiniBand network.

In the present example, for the sake of clarity only, ports 24 depicted on the left side of the figure serve as ingress ports that receive packets from the network, whereas ports 24 depicted on the right side of the figure serve as egress ports that transmit packets to the network. In practical implementations, however, port 24 typically serves both as an ingress port and as an egress port. Each of ports 24 may be activated or deactivated at any given time. As will be described below, the number of active ports affects the amount of power consumed by the network device.

Network device 20 may be used in constructing high-complexity communication networks of various suitable topologies for a variety of applications such as data centers, High-Performance Computing (HPC), distributed computing, and Artificial Intelligence (AI), to name a few.

Network device 20 is powered by an external power source 36 such as a Voltage Regulator (VR). The network device is typically assigned a power budget, in accordance with the VR capabilities and possibly with other requirements. In some embodiments the network device is part of a larger system (e.g., a Soc) comprising additional devices such as other switches or processors such as GPUs. In this case, the VR may be commonly shared among multiple devices that may be assigned dedicated power budgets. The power budget assigned to the network device may vary in time depending on the traffic flowing through the network device, processing workload, power demands of other devices, and the like.

In the present example, VR 36 provides electrical power to processing logic 28 of the network device via a main rail 38A, and to ports 24 via other rails 38B. In some embodiments, the VR senses the power consumed by the network device, e.g., by sensing the electrical current drawn, and notifies the network device of extreme power consumption so that the network device can take action to avoid exceeding the power budget, as will be described below.

Processing logic 28 receives packets from the communication network via the ingress ports, processes the received packets, and sends the processed packets to the communication network via the egress ports.

A data path in processing logic 28 between the ingress ports and egress ports, comprises a forwarding module 42, a queueing system 46 and multiple bandwidth shapers 50. Forwarding module 42 receives packets from the network via the ingress ports, parses the headers of the packets, and based on information in the parsed headers selects egress ports via which to send the packets to the network. Queueing system 46 queues the packets pending transmission and arbitrates among the queues for packet transmission depending on various factors such as Quality of Service (QoS). The packets to be transmitted are processed by bandwidth shapers 50 before being transmitted via the relevant egress ports.

In the present example, the underlying communication network comprises a lossless network, meaning that the network device does not drop packets, even when a queue in queuing system 46 becomes congested or overfilled. To this end, the network device comprises a flow control module 54 that manages queueing system 46. In an example embodiment, the flow control module allows transmission from a certain queue when this queue has sufficient flow credits, and stops transmission from this queue, otherwise.

Bandwidth shaper 50 can send traffic to the port at a data rate up to the maximal data rate supported by links 32, also referred to as the "line rate". In the description that follows, the term "bandwidth shaper" is also referred to simply as a "shaper" for brevity. It is noted that with a small packet size, the processing workload may increase, which may limit the data rate to some level below the line rate. Therefore, the average packet size used is typically larger than some minimal size in order to allow meeting the line rate.

In some embodiments, bandwidth shaper 50 supports configurable operational modes denoted "disabled" and "enabled" modes (or equivalently "OFF" and "ON" modes). When disabled, the bandwidth shaper outputs traffic at the available full data rate. When enabled, the bandwidth shaper outputs traffic at a specified shaper data rate that is lower than the available full data rate.

In an embodiment, network device 20 comprises a power controller 58 that toggles the bandwidth shapers between the disabled and enabled modes to control the average power consumed by the network device and the egress data rate. In general, the power controller toggles the bandwidth shapers at different first and second duty cycles in response to different first and second values of the average power consumed. In some embodiments, the power controller configures the shaper data rate in the shapers. In other embodiments, the shaper data rate may be determined externally to the network device and provisioned directly to the shapers. The shaper data rate may be determined depending on factors such as power budget, traffic patterns, the number of active ports among the ports of the network device, and the like, as will be described below.

In some embodiments, the power controller toggles the shapers based on the notifications received from VR 36, wherein the notifications are indicative of the average power consumed crossing certain power thresholds, e.g., a single power threshold, or a high threshold and a low threshold. In alternative embodiments, the VR provides the power controller with power measurements, and the power controller generates the notifications internally based on the power measurements.

Shaper Configuration Based on a Power Consumption Model

The overall average power consumed by the network device, denoted $P_{avg}$, may be modeled as a sum of several power components as follows:

$$P_{avg} = P_c + P_s + P_d \qquad \text{Equation 1}$$

The various power components are described herein.

The power component denoted $P_c$ is a Direct Current (DC) power consumption component that depends mainly on the chip process and material, and on leakage and power consumption in an idle state. The value of $P_c$ may be derived, for example, based on information provided by the chip manufacturer.

The power component denoted $P_s$ is a static (or slowly varying) power consumption component whose value depends on the number of active ports in the network device (and not on the traffic flowing through the network device). The value of $P_s$ may be evaluated by multiplying the power consumed by a single port (e.g., a Physical Layer—PHY—device) when active, by the number of active ports. The number of active ports may vary slowly in time, e.g., due to disconnecting ports, or shutting down ports that haven't been used for a long period of time.

The power component denoted $P_d$ is a dynamic power consumption component that varies in time. The value of $P_d$ typically increases with increasing the average egress data rate and the average packet rate, because higher data rates and packet rates result in increasing the workload imposed on the processing logic. It is noted that for given data traffic increasing the average packet rate is equivalent to reducing the average packet size.

The value of $P_d$ can be expressed as a function of the dynamic power component consumed by the network device when the shapers are disabled (denoted $P_{OFF}$), and the dynamic power component consumed by the network device when the shapers are enabled (denoted $P_{ON}$). The values of $P_{OFF}$ and $P_{ON}$ depend, in turn, on the egress data rates when the shapers are respectively disabled and enabled.

Let $0 \leq t_{DC} \leq 1$ denote the average percentage of time during which the shapers are disabled. Using the above notations, the dynamic power component is given by:

$$P_d = t_{DC} \cdot P_{OFF} + (1 - t_{DC}) \cdot P_{ON} \qquad \text{Equation 2}$$

In accordance with Equation 2, for given values of $P_{OFF}$ and $P_{ON}$ the dynamic power component can be controlled by modifying $t_{DC}$.

During worst-case traffic conditions, e.g., traffic that maximizes $P_d$ (and therefor also maximizes $P_{avg}$), the shapers are enabled all the time (meaning that $t_{DC}=0$), to force maximal reduction in the average power consumption. Let $P_{OFF\_WC}$ and $P_{ON\_WC}$ denote the power consumption under worst-case conditions when the shapers are respectively disabled and enabled. In the worst-case conditions and when the shapers are constantly enabled Equation 2 results in $P_d = P_{ON\_WC}$.

Worst-case traffic conditions may occur, e.g., when egress data rate hits the line rate of links 32, and with the minimal packet size (or maximal packet rate) that allows to achieve the line rate. Using the above notations, Equation 1 in worst-case conditions and assuming that the shapers are enabled may be expressed as:

$$\text{MAX}(P_{avg}) = P_c + P_s + P_{ON\_WC} \qquad \text{Equation 3}$$

For a given power budget denoted $P_B$, the following condition is required to be met:

$$P_B \geq \text{MAX}(P_{avg}) \qquad \text{Equation 4}$$

or based on Equations 3 and 4:

$$P_{ON\_WC} \leq P_B - P_c - P_s \qquad \text{Equation 5}$$

In some embodiments, the shaper data rate (when the shaper is enabled) may be determined sufficiently low so that $P_{ON\_WC}$ meets the condition in Equation 5. This ensures that under conditions that are less severe than the worst-case conditions the shapers may be toggled between being enabled and disabled at a suitable toggling duty cycle without the average power consumed exceeding the power budget $P_B$.

In some embodiments, the shaper data rate (when the shaper is enabled) is expressed as the full available data rate (when the shaper is disabled) multiplied by a "shaper factor" denoted S in the range $0 < S < 1$. Since the dynamic power component typically increases linearly (or close to linearly) with the egress data rate, the relationship between the power consumption when the shapers are enabled and when the shapers are disabled is given generally by:

$$P_{ON} = P_{OFF} \cdot S \qquad \text{Equation 6}$$

Using the shaper factor, the condition in Equation 5 can be expressed as given by:

$$S \leq \frac{P_B - P_c - P_s}{P_{OFF\_WC}} \qquad \text{Equation 7}$$

In some embodiments, the value of the shaper factor S is determined, e.g., using equation 7, and configured in the shapers. For maximizing the egress data rate, the maximal value of S that meets the condition in Equation 7 may be used. Alternatively, S may be selected smaller than the maximal S value (but with reduced egress data rate). With a shaper factor whose value is smaller than the maximal value (as in Equation 7 with equality), the ON duration of the toggling duty cycle is reduced.

The shaper factor S may be determined once and provisioned in the shapers. In another embodiment, S may be updated and re-provisioned as required. For example, upon detecting that the power budget and/or the number of active ports has been modified, the shaper factor is updated and reconfigured in the shapers. In some embodiments, the shaper factor in Equation 7 is tabulated in a suitable table for one or more values of power budget and/or one or more values of number of active ports. The usage of such as table may replace explicit calculation of Equation 7.

In the description above, the shaper data rate (or shaper factor) is determined based on worst-case traffic in terms of egress data rate and packet rate. In alternative embodiments, when the network device may be subjected to traffic caused by a virus attack, the processing logic may configure the shaper data rate based on the traffic pattern caused by the virus attack.

Power Consumption and Egress Data Rate Control by Toggling Bandwidth Shapers

Figure 2:
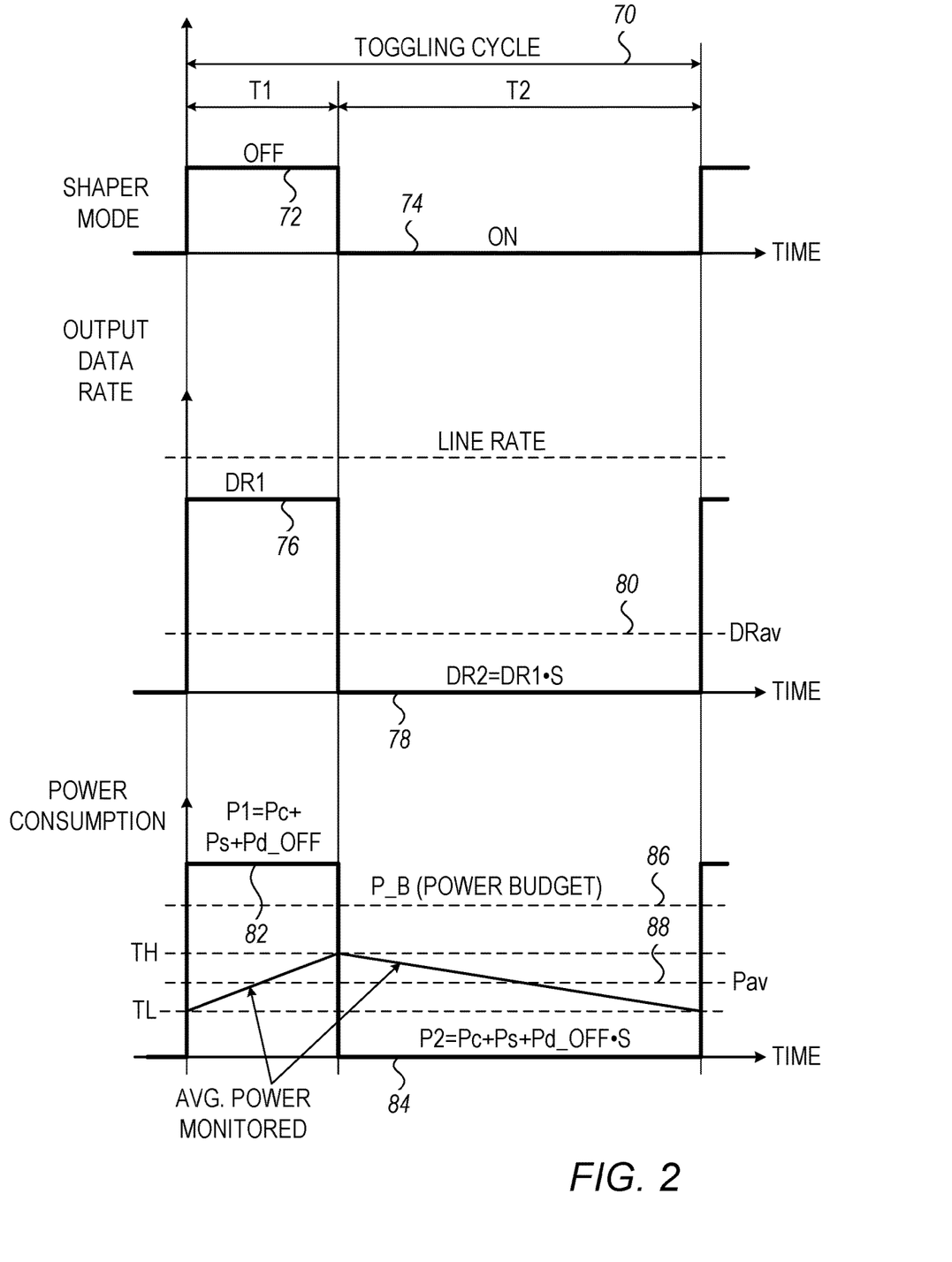
FIG. 2 is a diagram that schematically illustrates power consumption and egress data rate within a toggling cycle of bandwidth shapers, in accordance with an embodiment that is described herein.

FIG. 2 is a diagram that schematically illustrates power consumption and egress data rate within a toggling cycle of bandwidth shapers 50, in accordance with an embodiment that is described herein.

The upper part of FIG. 2 depicts a toggling cycle 70 applied by power controller 58 to shapers 50. During the first segment (T1) of the toggling cycle the shapers are disabled (OFF period 72) and during the second segment (T2) of the cycle, the shapers are enabled (ON period 74).

The middle part of FIG. 2 depicts the overall data rate output by the network device during the toggling cycle. During the OFF period the shapers are disabled, and the output data rate equals the available data rate denoted DR1 76. In the example of FIG. 2, DR1 is lower than the line rate of links 32. During the ON period the shapers are enabled, and the shapers reduce the output data rate to DR2 78. Given the shaper factor S, DR2 may be expressed as DR2=DR1·S. The average egress data rate due to the toggling is denoted DRavg 80.

The lower part of FIG. 2 depicts the power consumed by the network device during the toggling cycle. Let P1 (82) and P2 (84) denote the power consumption during the OFF period and during the ON period, respectively. In the example of FIG. 2, P1 is temporarily higher than the power budget denoted P_B (86) and P2 is lower than P_B.

Based on the Equations and notations above, P1 can be expressed as P1=Pc+Ps+Pd_OFF, and P2 can be expressed as P2=Pc+Ps+Pd_ON, or P2=Pc+Ps+Pd_OFF·S. In these expressions, Pd_OFF and Pd_ON denote the dynamic power component when the shapers are disabled and enabled, respectively.

In the example of FIG. 2, the power controller toggles the shapers based on power thresholds denoted TH and TL. During the toggling cycle, the average power is monitored and compared to the power thresholds TH and TL. When the shapers are disabled, the average power monitored increases, and upon hitting TH the power controller is notified to toggle the shapers to the enabled mode. When the shapers are enabled, the average power monitored decreases, and upon hitting TL the power controller is notified to toggle the shapers to the disabled mode. The average power consumption due to the toggling is denoted Pavg (88).

Figure 3:
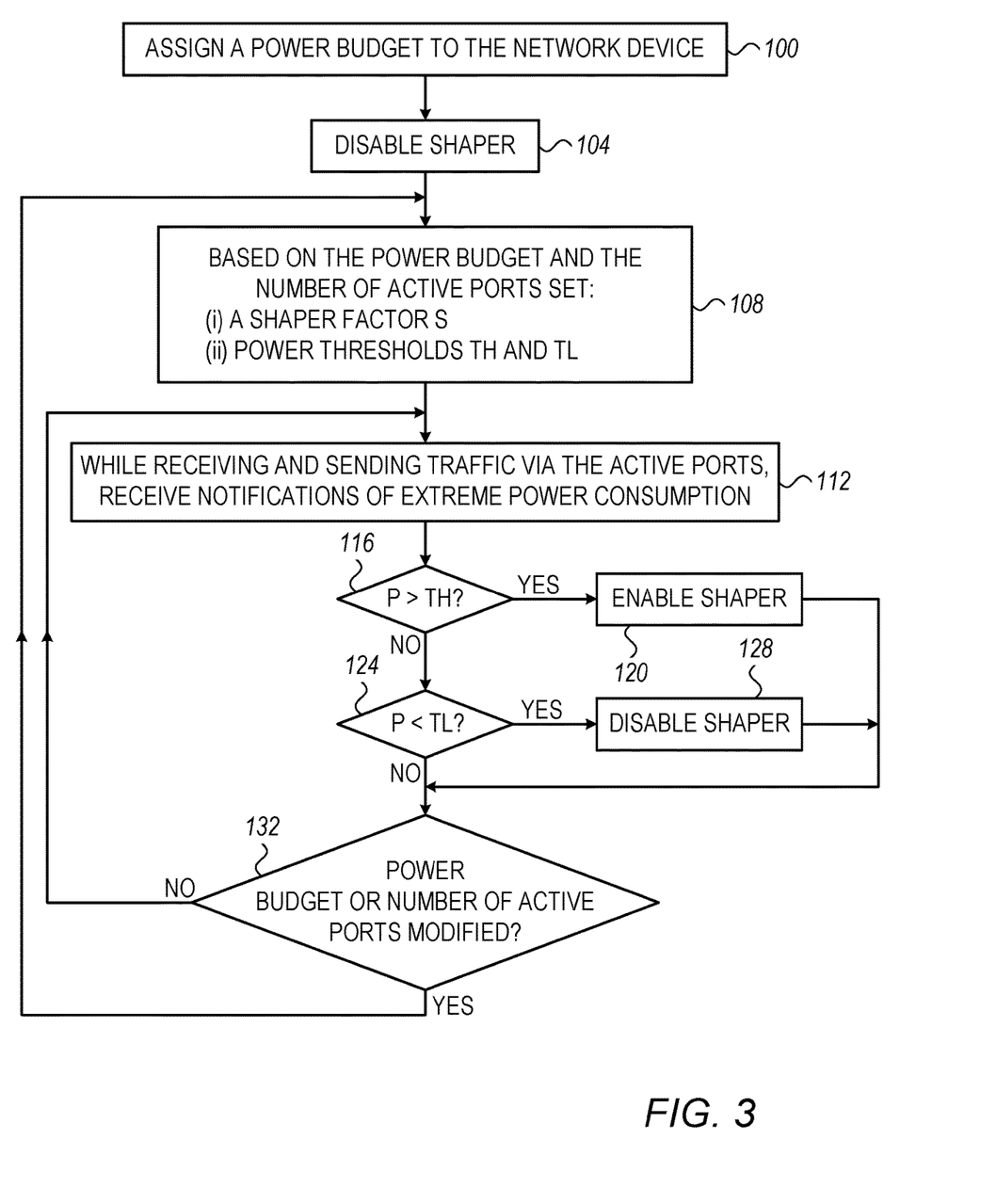
FIG. 3 is a flow chart that schematically illustrates a method for controlling power consumption and egress data rate, in accordance with an embodiment that is described herein.

FIG. 3 is a flow chart that schematically illustrates a method for controlling power consumption and egress data rate, in accordance with an embodiment that is described herein.

The method will be described as executed by elements of network device 20 in FIG. 1. In the present example, the power supply notifies power controller 58 of crossing high and low power thresholds denoted TH and TL, respectively.

The method begins with the network device being assigned a power budget, at a power budget setting step 100. At a shaper disabling step 104, the power controller initializes the shapers to the disabled mode. At configuration step 108, (i) the shapers are provisioned with a shaper factor S, and (ii) the power supply is provisioned with power thresholds TH and TL. The shaper factor S may be determined based on worst-case conditions as described above.

At a communication step 112, the network device receives traffic from the network via ports 24 that are currently active and sends traffic to the network via ports 24 that are currently active. While communicating the traffic, the power controller receives from the power source notifications indicating that the average power consumption crosses above TH or below TL.

At a high limit query step 116, the power controller checks whether a received notification indicates that the monitored power consumption is higher than TH, and if so, enables the shapers, at a shaper enabling step 120. Otherwise, at a low limit query step 124, the power controller checks whether a received notification indicates that the monitored power consumption is lower than TL, and if so, disables the shapers, at a shaper disabling step 128. Otherwise, and following shapers enabling or disabling steps 120 and 128, the method proceeds to a reconfiguration query step 132.

At step 132, the power controller checks whether the power budget assigned to the network device, or the number of active ports in the network device, has been modified, and if so, the method loops back to step 108 to re-configure the shaper factor and power thresholds. Otherwise, the method loops back to step 112 to continue communication and receiving notifications from the power supply.

Figure 4:
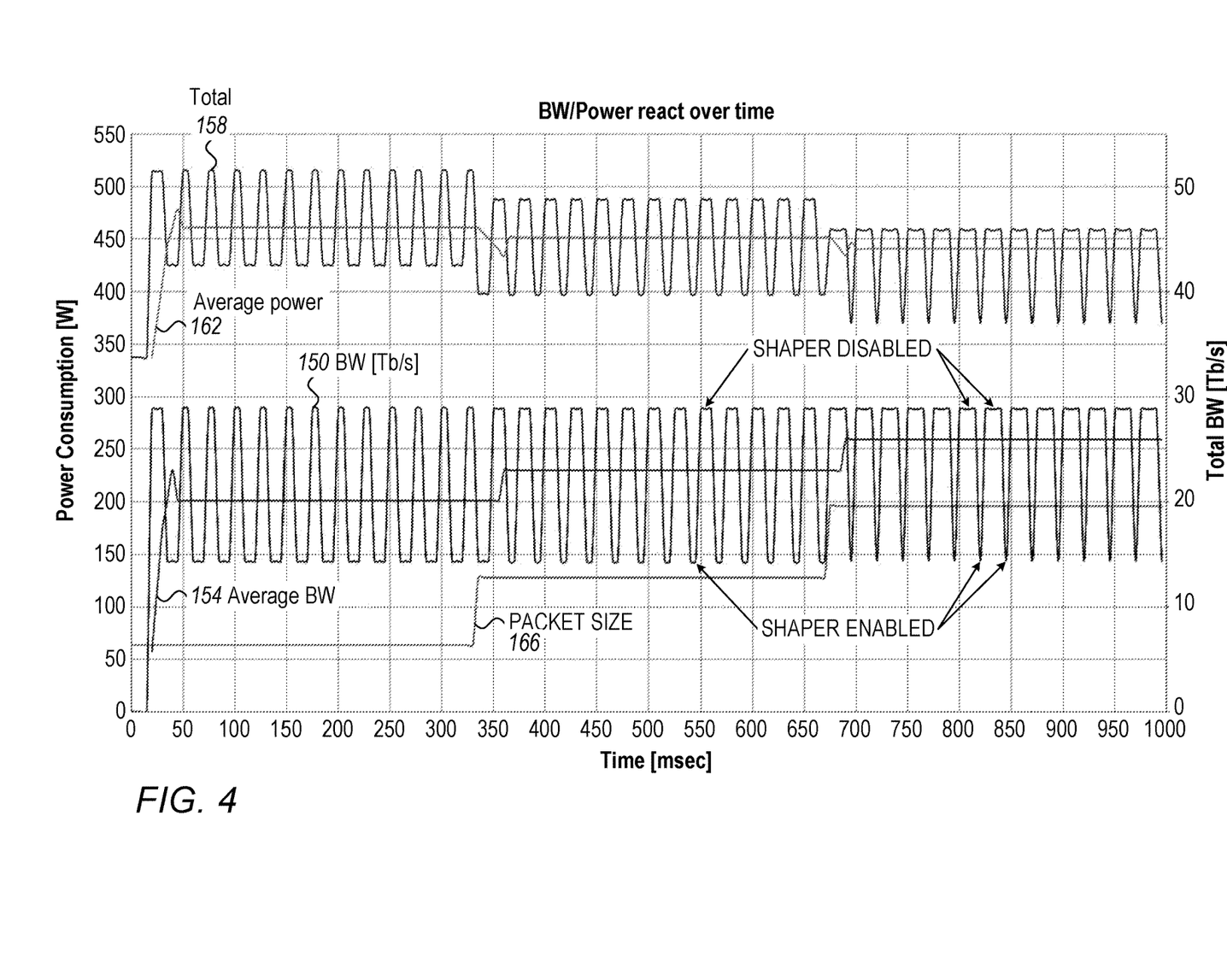
FIG. 4 is a diagram that schematically illustrates adaptation of the toggling pattern of bandwidth shapers for improving the overall egress data rate, in accordance with an embodiment that is described herein.

FIG. 4 is a diagram that schematically illustrates adaptation of the toggling pattern of bandwidth shapers for improving the overall egress data rate, in accordance with an embodiment that is described herein.

The waveforms in FIG. 4 were produced using a computer simulation, based on the structure of network device 20 of FIG. 1, and on the flow chart of FIG. 3. The simulation refers to an example use case in which the power consumption changes in response to reduction in the packet rate. The change in power consumption leads to a change in the toggling duty cycle between the ON and OFF states. Reducing the data consumption allows to increase the average BW since the shaper is enabled for shorter durations.

In FIG. 4, a waveform 150 depicts the overall bandwidth output by the network device while toggling bandwidth shapers 50 between being disabled (high BW) and enabled (low BW). A waveform 154 depicts the average output bandwidth (egress data rate) due to the toggling. The value of the shaper factor S in this example is about 0.5. It is assumed that the upper data rate value is lower than the underlying line rate (not shown).

A waveform 158 depicts the power consumed by network device 20 while toggling shapers 50. As shown in the figure, the toggling pattern of the power consumption is synchronized to the toggling pattern of the shapers. A waveform 162 depicts the average power consumption due to the toggling.

A waveform 166 depicts the average packet size used. In the present example, at times 330 and 670 milliseconds, the packet size changes, which results in adapting the toggling duty cycle. Specifically, as the packet size increases, the duty cycle changes in favor of the disabled mode of the shapers. Since a larger packet size requires less power consumption, the toggling pattern is modified to increase the average output bandwidth, while retaining the average power consumption below the power budget.

The embodiments described above are given by way of example, and other suitable embodiments can also be used. For example, although the embodiments above refer mainly to a network switch or router, the disclosed embodiments are similarly applicable to other types of network devices such as a network adapter, e.g., a Network Interface Controller (NIC).

As another example, although in the embodiments above all the shapers are toggled together, in other embodiments, different shapers may be toggled based on different respective toggling patterns.

In some embodiments, power consumption data is collected from one or more switches across the underlying system using telemetry methods. This data may be used for adjusting the power budgets assigned to the switches in the system.

Although in the embodiments described above the shaper data rate (or shaper factor) is essentially nonadaptive, this is not mandatory. In other embodiments, in addition to shaper toggling, the shaper data rate may be modified adaptively by applying a control loop that adapts the shaper data rate based on actual power level consumed by the device. The control loop may be implemented, for example, using a Proportional-Integral-Derivative (PID) control method. Such a control loop allows smoother tracking of the traffic bandwidth, compared to the shaper toggling alone.

The network device configuration of FIG. 1 is given by way of example, and other suitable network device configurations can also be used.

Some elements of network device 20, e.g., elements of processing logic 28 such as forwarding module 42, power controller 58 and bandwidth shapers 50, may be implemented in hardware, e.g., in one or more Application-Specific Integrated Circuits (ASICs) or Field-Programmable Gate Arrays (FPGAs). Additionally or alternatively, some elements of the network device can be implemented using software, or using a combination of hardware and software elements.

Elements that are not necessary for understanding the principles of the present application, such as various interfaces, addressing circuits, timing and sequencing circuits and debugging circuits, have been omitted from FIG. 1 for clarity.

In some embodiments, some of the functions of processing logic 28 may be carried out by a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Although the embodiments described herein mainly address controlling power consumption and bandwidth in network switches, the methods and systems described herein can also be used in other applications, such as in other systems that control a tradeoff between power consumption and performance.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A device, comprising:
   one or more ports, to connect to a communication network;
   one or more bandwidth shapers, wherein a given bandwidth shaper is to: (i) when disabled, output traffic at an available full data rate, and (ii) when enabled, output the traffic at a specified shaper data rate lower than the available full data rate; and
   processing logic, to:
      receive or generate notifications, which are indicative of average power that is consumed by the device while outputting traffic through the one or more bandwidth shapers via the one or more ports; and
      based on at least some of the notifications, toggle at least one of the one or more bandwidth shapers between being enabled and disabled so as to retain the average power consumed below a specified power budget, by (i) enabling the one or more bandwidth shapers in response to detecting that the average power consumed is above a specified high power limit lower than the power budget, and (ii) disabling the one or more bandwidth shapers in response to detecting that the average power consumed is below a specified low power limit lower than the power budget.

2. The device according to claim 1, wherein the processing logic is to toggle the one or more bandwidth shapers to improve an overall data rate flowing through the network device while retaining the average power consumed below the specified power budget.

3. The device according to claim 1, wherein the notifications are indicative of crossing one or more defined power thresholds.

4. The device according to claim 1, wherein the one or more ports comprise a plurality of ports, and wherein the processing logic is to configure the shaper data rate depending on an overall number of active ports among the plurality of ports.

5. The device according to claim 1, wherein the processing logic is to configure the shaper data rate based on modeling dynamic power consumption that varies over time depending on traffic attributes selected from a list comprising a data rate and a packet size.

6. The device according to claim 1, wherein the processing logic is to configure the shaper data rate based on a traffic pattern caused by a virus attack.

7. The device according to claim 1, wherein the processing logic is to configure the shaper data rate adaptively by applying a control loop that adapts the shaper data rate based on actual power level consumed by the device.

8. A device, comprising:
   one or more ports, to connect to a communication network;
   one more bandwidth shapers, wherein a given bandwidth shaper is to: (i) when disabled, output traffic at an available full data rate, and (ii) when enabled, output the traffic at a specified shaper data rate lower than the available full data rate; and
   processing logic, to:

receive or generate notifications, which are indicative of average power that is consumed by the device while outputting traffic through the one or more bandwidth shapers via the one or more ports; and based on at least some of the notifications, toggle one or more bandwidth shapers between being enabled and disabled, at different first and second duty cycles in response to different first and second values of the average power consumed, to retain the average power consumed below a specified power budget.

9. A device, comprising:

one or more ports, to connect to a communication network;

one or more bandwidth shapers, wherein a given bandwidth shaper is to: (i) when disabled, output traffic at an available full data rate, and (ii) when enabled, output the traffic at a specified shaper data rate lower than the available full data rate; and processing logic, to:

configure the shaper data rate so that for a defined worst-case traffic pattern flowing through the network device, constantly enabling the one or more bandwidth shapers guarantees that the average power consumed does not exceed a specified power budget;

receive or generate notifications, which are indicative of average power that is consumed by the device while outputting traffic through the one or more bandwidth shapers via the one or more ports; and based on at least some of the notifications, toggle at least one of the one or more bandwidth shapers between being enabled and disabled, to retain the average power consumed below the specified power budget.

10. The device according to claim 9, wherein the one or more ports are coupled to links having a specified line rate, and wherein the worst-case traffic pattern corresponds to (i) transmitting packets via the one or more ports at a data rate that equals the line rate, and (ii) the packets having a minimal packet size that allows achieving the line rate.

11. A device, comprising:

one or more ports, to connect to a communication network;

one or more bandwidth shapers, wherein a given bandwidth shaper is to: (i) when disabled, output traffic at an available full data rate, and (ii) when enabled, output the traffic at a specified shaper data rate lower than the available full data rate; and processing logic, to:

configure the shaper data rate based on a shaper factor specifying a ratio between the shaper data rate and the available full data rate;

receive or generate notifications, which are indicative of average power that is consumed by the device while outputting traffic through the one or more bandwidth shapers via the one or more ports; and based on at least some of the notifications, toggle at least one of the one or more bandwidth shapers between being enabled and disabled, to retain the average power consumed below a specified power budget.

12. A method for communication, comprising:

in a device that comprises one or more ports for connecting to a communication network, and one or more bandwidth shapers, wherein a given bandwidth shaper (i) when disabled, outputs traffic at an available full data rate, and (ii) when enabled, outputs the traffic at a specified shaper data rate lower than the available full data rate, receiving for generating notifications, which are indicative of average power that is consumed by the device while outputting traffic through the one or more bandwidth shapers via the one or more ports; and based on at least some of the notifications, toggling at least one of the one or more bandwidth shapers between being enabled and disabled so as to retain the average power consumed below a specified power budget, by (i) enabling the one or more bandwidth shapers in response to detecting that the average power consumed is above a specified high power limit lower than the power budget, and (ii) disabling the one or more bandwidth shapers in response to detecting that the average power consumed is below a specified low power limit lower than the power budget.

13. The method according to claim 12, wherein toggling the one or more bandwidth shapers comprises toggling the one or more bandwidth shapers at different first and second duty cycles in response to different first and second values of the average power consumed.

14. The method according to claim 12, wherein toggling the one or more bandwidth shapers comprises toggling the one or more bandwidth shapers to improve an overall data rate flowing through the network device while retaining the average power consumed below the specified power budget.

15. The method according to claim 12, wherein the notifications are indicative of crossing one or more defined power thresholds.

16. The method according to claim 12, and comprising configuring the shaper data rate so that for a defined worst-case traffic pattern flowing through the network device, constantly enabling the one or more bandwidth shapers guarantees that the average power consumed does not exceed the power budget.

17. The method according to claim 16, wherein the one or more ports are coupled to links having a specified line rate, and wherein the worst-case traffic pattern corresponds to (i) transmitting packets via the one or more ports at a data rate that equals the line rate, and (ii) the packets having a minimal packet size that allows achieving the line rate.

18. The method according to claim 12, wherein the one or more ports comprise a plurality of ports, and comprising configuring the shaper data rate depending on an overall number of active ports among the plurality of ports.

19. The method according to claim 12, and comprising configuring the shaper data rate based on modeling dynamic power consumption that varies over time depending on traffic attributes selected from a list comprising a data rate and a packet size.

20. The method according to claim 12, and comprising configuring the shaper data rate based on a shaper factor specifying a ratio between the shaper data rate and the available full data rate.

21. The method according to claim 12, and comprising configuring the shaper data rate based on a traffic pattern caused by a virus attack.

22. The method according to claim 12, and comprising configuring the shaper data rate adaptively by applying a control loop that adapts the shaper data rate based on actual power level consumed by the device.

* * * * *